(12) United States Patent
Chen et al.

(10) Patent No.: US 7,871,166 B2
(45) Date of Patent: Jan. 18, 2011

(54) OPTICAL PROJECTION SYSTEM UTILIZING AN ASPHERICAL LENS FOR PRODUCING A PINCUSHION DISTORTION OF THE IMAGE AND A REFLECTOR FOR COMPENSATING THE SAME

(75) Inventors: Jung-Yao Chen, Hsin-Chu (TW);
Ching-Lung Lai, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 473 days.

(21) Appl. No.: 12/136,104

(22) Filed: Jun. 10, 2008

(65) Prior Publication Data
US 2009/0079946 A1 Mar. 26, 2009

(30) Foreign Application Priority Data
Sep. 20, 2007 (TW) ............... 96135185 A

(51) Int. Cl.
*G03B 21/14* (2006.01)
*G03B 21/28* (2006.01)
(52) U.S. Cl. .......................... 353/69; 353/98
(58) Field of Classification Search ............. 353/69,
353/98, 30, 37, 70, 76, 77; 359/364, 362,
359/728, 649–651, 448, 668, 449, 838, 850,
359/247, 242, 292; 348/771
See application file for complete search history.

(56) References Cited

U.S. PATENT DOCUMENTS

| | | | |
|---|---|---|---|
| 4,003,080 A | | 1/1977 | Maiman et al. |
| 5,096,288 A | * | 3/1992 | Yano et al. ............... 353/69 |
| 5,442,484 A | * | 8/1995 | Shikawa .................. 359/651 |
| 5,716,118 A | * | 2/1998 | Sato et al. ................. 353/98 |
| 6,123,425 A | * | 9/2000 | Ohzawa ..................... 353/69 |
| 6,406,150 B1 | | 6/2002 | Burstyn |
| 6,631,994 B2 | | 10/2003 | Suzuki et al. |
| 7,370,977 B2 | * | 5/2008 | Lee .......................... 353/70 |
| 2005/0174545 A1 | | 8/2005 | Lee |

* cited by examiner

*Primary Examiner*—Que T Le
*Assistant Examiner*—Pascal M Bui-Pho
(74) *Attorney, Agent, or Firm*—Chun-Ming Shih

(57) ABSTRACT

An optical projection system includes an image generation element, a projection lens set for receiving an image from the image generation element, refracting the image and projecting the image out, and a reflector for reflecting the image from the projection lens set and projecting the image to a screen. The projection lens set includes an aspherical lens with a distortion coefficient larger than 0.5 for producing a pincushion distortion of the image and several other lenses, and the absolute value of the sum of the distortion coefficients of the other lenses are less than the distortion coefficient of the aspherical lens. The reflector produces a barrel distortion to the image for compensating a pincushion distortion of the image produced by the projection lens set.

15 Claims, 3 Drawing Sheets

OPTICAL PROJECTION SYSTEM UTILIZING AN ASPHERICAL LENS FOR PRODUCING A PINCUSHION DISTORTION OF THE IMAGE AND A REFLECTOR FOR COMPENSATING THE SAME

BACKGROUND OF THE INVENTION

1. Field of the Invention

The present invention relates to an optical projection system, and more particularly to an optical projection system that is thin, light and capable of controlling a distortion of an image projected by the optical projection system.

2. Description of the Related Art

An optical projection system generally includes a light source capable of generating a light beam, a parabola reflector capable of reflecting the light beam, an illumination lens capable of compressing the light beam, a light valve capable of converting the light beam into an image in response to an electrical image signal, an optical projection lens capable of magnifying and projecting the image and a screen capable of displaying the image.

A basic working principle of the optical projection system is as follows. First, the light source generates a light beam. The light beam is reflected by the parabola reflector and projected on the illumination lens, which further projects the light beam onto the light valve. The light valve converts the light beam into an image in response to an electrical image signal and projects the image to the optical projection lens. The optical projection lens magnifies the image and projects the magnified image to the screen so as to display the magnified image thereon.

However, for the optical projection system as mentioned above, the overall thickness of the system depends on the distance between the parabola reflector and the screen. Wide angle optical projection lenses capable of projecting images in a wide angle have been used to reduce the overall thickness of the optical projection system, but the wide angle optical projection lenses are limited in the view angles they provide. To overcome this problem, U.S. Pat. No. 4,003,080 discloses an optical projection system 10 as shown in FIG. 1. A curved reflecting element having a convex curvature 14 and a planar reflecting element 16 are used to reflect a light beam coming from an optical projection lens 12, and change the optical path of the light beam so as to project the light beam onto a screen 18 in compact space. An overall volume of the optical projection system is thus reduced. In addition, U.S. Pat. No. 6,406,150 discloses a rear projection system 20 as shown in FIG. 2, in which a curved cylindrical reflecting element 24 is configured to change an optical path of a light beam coming from an optical projection lens 22 so as to project the light beam onto a screen 26 while reducing an overall volume of the rear projection system 20. Although the overall volumes of the optical projection systems as mentioned above are reduced, the issue of image distortion after the light beam being reflected or refracted is not considered so that the resulted images generally carry trapezoidal distortion, which may severely degrade the resulted image quality. Hence it is desired to provide an optical projection system that overcomes the above-mentioned image distortion problem.

Other objectives, features and advantages of the present invention will be further understood from the further technological features disclosed by the embodiments of the present invention wherein there are shown and described preferred embodiments of this invention, simply by way of illustration of modes best suited to carry out the invention.

SUMMARY OF THE INVENTION

The present invention is to provide an optical projection system that is thin, light and capable of controlling a distortion of an image projected by the optical projection system.

An optical projection system in accordance with a preferred embodiment of the present invention is provided. The optical projection system includes an image generation element, a projection lens set for receiving an image from the image generation element and projecting the image out after refracting the image, and a reflector for reflecting the image from the projection lens set and projecting the image to a screen. The projection lens set includes an aspherical lens with a distortion coefficient larger than 0.5 for producing a pincushion distortion of the image and several other lenses, and the absolute value of the sum of the distortion coefficients of the other lenses are less than the distortion coefficient of the aspherical lens. The reflector produces a barrel distortion of the image for compensating a pincushion distortion of the image produced by the projection lens set.

The image generation element includes a light source and a light valve. The light source is configured for generating a light beam. The light valve is configured for converting the light beam into an image.

The optical projection system has a combined structure of the projection lens set and the aspherical reflector, which leads to a reduced overall volume of the optical projection system. In addition, the combination of the aspherical reflector, which has a Seidel aberration coefficient less than zero and the aspherical lens, which has a Seidel aberration coefficient greater than 0.5, achieves image distortion compensation. Furthermore, the absolute value of the sum of the distortion coefficients of the other lenses which are set to be less than the distortion coefficient of the aspherical lens reduces image distortion in the projection process so that a relatively good image quality is achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
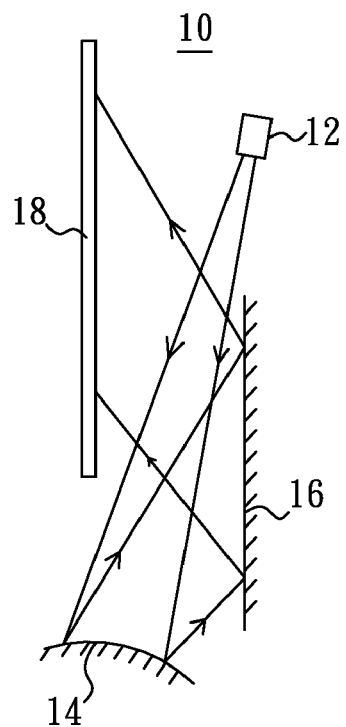
FIG. 1 is a schematic view of an optical path of an optical projection system in accordance with a related art.
Figure 2:
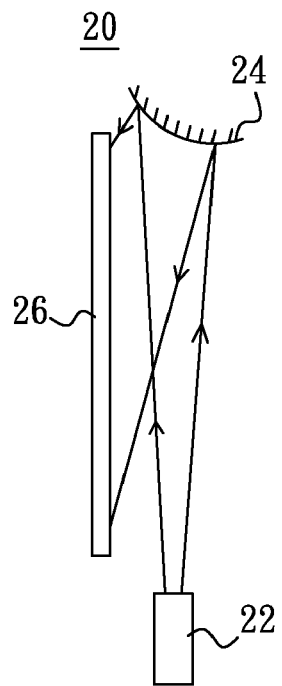
FIG. 2 is a schematic view of an optical path of a rear projection system in accordance with another related art.
Figure 3:
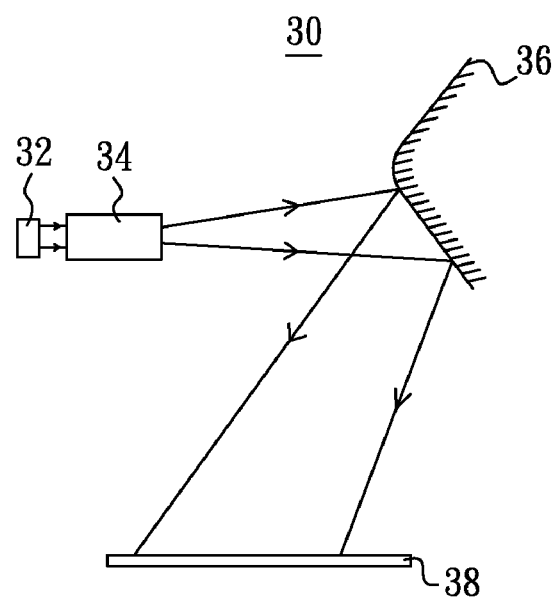
FIG. 3 is a schematic view of an optical path of an optical projection system in accordance with a preferred embodiment of the present invention.

Referring to FIG. 3, an optical projection system 30 in accordance with a preferred embodiment of the present invention is provided. The optical projection system 30 includes an image generation element 32, a projection lens set 34 and a reflector 36. The image generation element 32 includes a light source (not shown) and a light valve (not shown). The light source is configured for generating a light beam. The light valve is configured for converting the light beam into an image. For example, the light valve may be a digital micromirror device (DMD). The projection lens set 34 is configured for receiving an image from the image generation element 32, refracting the image, and projecting the image to the reflector 36. The reflector 36 is configured for receiving the image from the projection lens set 34 and projecting the image to a screen 38 so as to display the image thereon.

Figure 5:
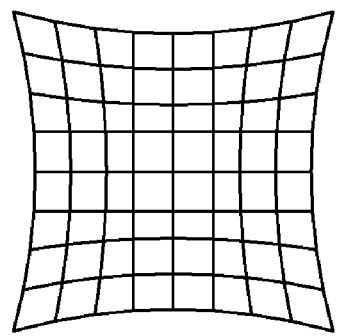
FIG. 5 illustrates a pincushion distortion of an image produced by an aspherical lens of an optical projection system in FIG. 3.
Figure 6:
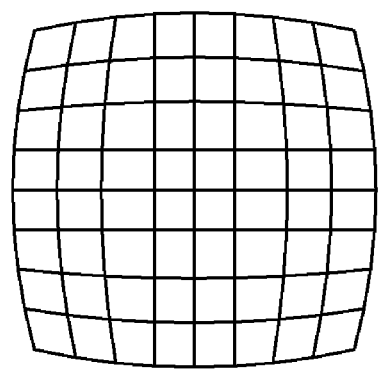
FIG. 6 illustrates a barrel distortion of an image produced by a reflector of an optical projection system in FIG. 3.

To solve the problem of image distortion of the optical projection system 30, the projection lens set 34 of the optical projection system 30 includes an aspherical lens and several other lenses. The Seidel aberration coefficient of the aspherical lens is designed to be greater than 0.5. According to the definition of the Seidel aberration coefficient, such an aspherical lens is capable of generating a pincushion distortion on the image that passes therethrough, that is, the edge areas of the image move toward the center of the image and form a concave curvature, as shown in FIG. 5. Besides, the absolute value of the sum of the distortion coefficients of the other lenses is set to be less than the distortion coefficient of the aspherical lens. In addition, the reflector 36 of the optical projection system 30 has a Seidel aberration coefficient less than zero, which produces barrel distortion on the image after the image is reflected by the reflector 36, that is, the edge areas of the image move away from the center of the image and form a convex curvature, as shown in FIG. 6. Preferably, the reflector 36 may be an aspherical reflecting mirror. By this means, the barrel distortion produced by the reflector 36 compensates the pincushion distortion produced by the aspherical lens and a correct image is projected onto the screen 38. The image distortion is thus avoided.

Figure 4:
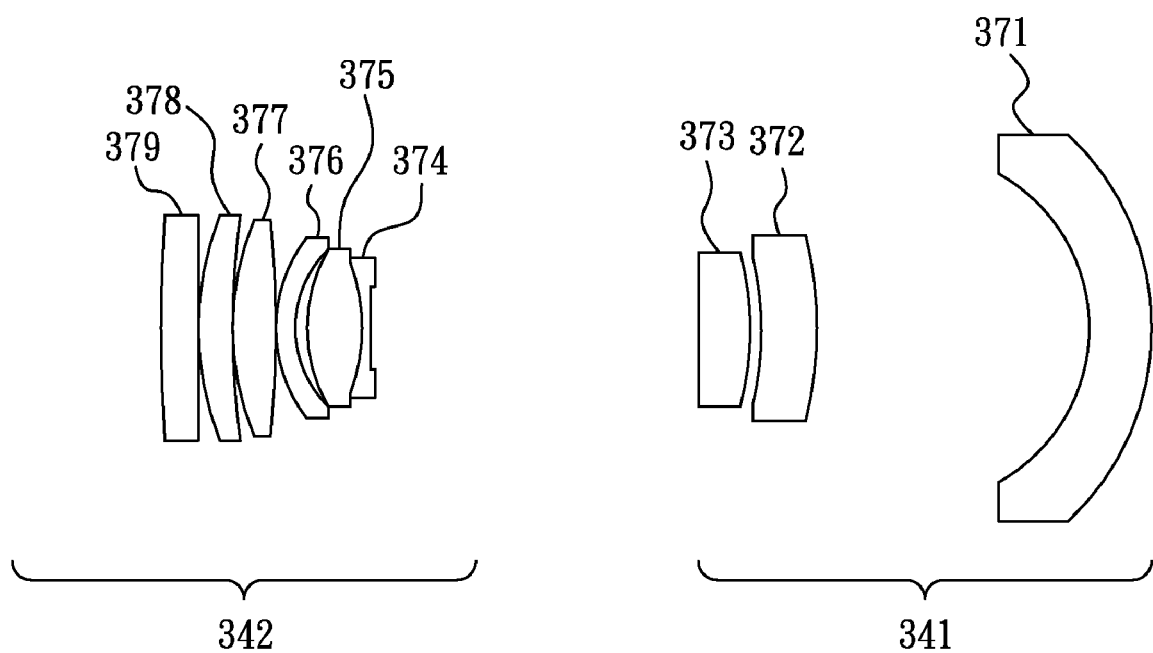
FIG. 4 is a schematic view of a projection lens set of the optical projection system in FIG. 3.

In this embodiment, the projection lens set 34 has a telecentric lens structure, the optical structure of which is illustrated in FIG. 4. It is understood that in this embodiment an aspherical lens and eight spherical lenses are used as an example and should by no means limit the scope of the present invention.

In the projection lens set 34, one or one part of the lenses and the aspherical lens 371 are located in a first lens group 341, the other part of the lenses are located in a second lens group 342, the first lens group 341 has a positive refractive power, and the second lens group 342 has a negative refractive power. The first lens group 341 is disposed near to the reflector 36. The second lens group 342 is disposed near to the image generation element 32. The lenses in the first lens group 341 include a first lens 372 and a second lens 373. The aspherical lens 371, the first lens 372 and the second lens 373 are disposed from near the reflector 36 toward the image generation element 32 in sequence. The aspherical lens 371 has a negative refractive power. The first and second lenses 372 and 373 have positive refractive powers. In this embodiment, the aspherical lens 371 may be replaced by a group of aspherical lenses (not shown), in other words, multiple aspherical lenses. The second lens group 342 is disposed between the first lens group 371 and the image generation element 32. The second lens group 342 includes a third lens 374, a fourth lens 375, a fifth lens 376, a sixth lens 377, a seventh lens 378 and an eighth lens 379, which are disposed from near the first lens group 341 toward the image generation element 32 in sequence. The third lens 374, the fourth lens 375, the fifth lens 376, the sixth lens 377, the seventh lens 378 and the eighth lens 379 respectively have negative, positive, negative, positive, positive, and positive refractive powers. The third lens 374 and the fourth lens 375 construct a cemented lens. The sum of the Seidel aberration coefficients of all the elements in the projection lens set 34 is designed to be positive, wherein the sum of the Seidel aberration coefficients of two surfaces of the aspherical lens 371 is positive and greater than 0.5. To control the over-distortion of the image after being refracted for multiple times by the projection lens set 34, the absolute value of the sum of the distortion coefficients of the other eight lenses is set to be less than the distortion coefficient of the aspherical lens or the sum of the distortion coefficients of the aspherical lenses. As a result, the projection lens set 34 produces a pincushion distortion to an image from the image generation element 32, as shown in FIG. 5.

The reflector 36 is an aspherical reflector with a negative Seidel aberration coefficient and configured for producing barrel distortion to the image from the projection lens set 34, as shown in FIG. 6, to compensate the pincushion distortion produced by the aspherical lens 371 and reduce the overall image distortion.

In this embodiment, the light beam from the image generation element 32 is refracted by the projection lens set 34, which reduces the distance in the optical path for the light beam to focus. The light beam is reflected by the aspherical reflector 36 so that there is an appropriate angle between the original light axis and the new axis. The light beam is eventually projected onto the screen. By using the projection lens set 34 along with the aspherical reflector 36, the overall volume of the optical projection system 30 is reduced. In addition, the combination of the aspherical reflector 36, which has a Seidel aberration coefficient less than zero and the aspherical lens 371, which has a Seidel aberration coefficient greater than 0.5, achieves image distortion compensation. Furthermore, the absolute value of the sum of the distortion coefficients of the other lenses which are set to be less than the distortion coefficient of the aspherical lens reduces image distortion in the projection process so that a relatively good image quality is achieved.

In another preferred embodiment of the present invention, a stop (not shown) is disposed between the first lens group 341 and the second lens group 342 of the projection lens set 34, and the stop is configured for controlling the mount of light passing therethrough as needed. Alternatively, a reflecting element (not shown) is disposed between the lenses in the first lens group 341 or between the first lens group 341 and the second lens group 342, and the reflecting element is configured for changing the direction of the light beam and the volume of the optical projection system 30 as required by the design. Another reflecting element may be alternatively disposed between the lenses in the second lens group 342 to serve the same purpose.

In the above-mentioned embodiments, the optical projection system has a combined structure of the projection lens set and the aspherical reflector, which leads to a reduced overall volume of the optical projection system. In addition, the combination of the aspherical reflector, which has a Seidel aberration coefficient less than zero and the aspherical lens, which has a Seidel aberration coefficient greater than 0.5, achieves image distortion compensation. Furthermore, and the absolute value of the sum of the distortion coefficients of the other lenses are set to be less than the distortion coefficient of the aspherical lens reduces image distortion in the projection process so that a relatively good image quality is achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical projection system, comprising:
   an image generation element;
   a projection lens set for receiving an image from the image generation element, refracting the image and projecting the image out, wherein the projection lens set comprises an aspherical lens with a distortion coefficient larger than 0.5 for producing a pincushion distortion of the image and several other lenses, and the absolute value of the sum of distortion coefficients of the other lenses are less than the distortion coefficient of the aspherical lens; and
   a reflector for reflecting the image from the projection lens set, and projecting the image to a screen, wherein the reflector is capable of compensating the pincushion distortion of the image produced by the projection lens set.

2. The optical projection system as described in claim 1, wherein the reflector is an aspherical reflecting mirror.

3. The optical projection system as described in claim 1, wherein the distortion coefficients of the aspherical lens and the other lenses are Seidel aberration coefficients.

4. The optical projection system as described in claim 1, wherein the reflector has a distortion coefficient less than zero and is configured to produce a barrel distortion to the image, and the barrel distortion is configured to compensate the pincushion distortion produced by the projection lens set.

5. The optical projection system as described in claim 4, wherein the distortion coefficient of the reflector is Seidel aberration coefficient.

6. The optical projection system as described in claim 1, wherein the projection lens set has a telecentric lens structure.

7. The optical projection system as described in claim 6, wherein one or one part of the lenses in the projection lens set and the aspherical lens are located in a first lens group, the other part of the lenses are located in a second lens group, the first lens group has a positive refractive power, and the second lens group has a negative refractive power.

8. The optical projection system as described in claim 7, wherein the lenses in the first lens group comprises a first lens and a second lens, the aspherical lens, the first lens and the second lens are disposed from near the reflector toward the image generation element in sequence, and the aspherical lens has a negative refractive power and the first and second lenses have positive refractive powers.

9. The optical projection system as described in claim 7, wherein the optical projection system further comprises a reflecting element disposed between the first lens group and the second lens group.

10. The optical projection system as described in claim 7, wherein the optical projection system further comprises a reflecting element disposed between the lenses in the first lens group.

11. The optical projection system as described in claim 7, wherein the second lens group is disposed between the first lens group and the image generation element, the second lens group comprises a third lens, a fourth lens, a fifth lens, a sixth lens, a seventh lens and an eighth lens disposed in sequence from near the first lens group toward the image generation element, the third lens, the fourth lens, the fifth lens, the sixth lens, the seventh lens and the eighth lens respectively have negative, positive, negative, positive, positive, and positive refractive powers, and the third lens and the fourth lens construct a cemented lens.

12. The optical projection system as described in claim 7, wherein the optical projection system further comprises a reflecting element disposed between the lenses in the second lens group.

13. The optical projection system as described in claim 7, wherein the optical projection system further comprises a stop disposed between the first lens group and the second lens group.

14. The optical projection system as described in claim 1, wherein the image generation element comprises a light source and a light valve.

15. The optical projection system as described in claim 14, wherein the light valve is a digital micromirror device.

* * * * *